(12) United States Patent
Yagi (10) Patent No.: US 7,220,030 B2
(45) Date of Patent: May 22, 2007

(54) EXTERIOR MIRROR HAVING LAMP AND EXTERIOR REAR-VIEW MIRROR HAVING LAMP

(75) Inventor: Hajime Yagi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 244 days.

(21) Appl. No.: 10/768,736

(22) Filed: Feb. 2, 2004

(65) Prior Publication Data

US 2004/0213009 A1 Oct. 28, 2004

(30) Foreign Application Priority Data

Feb. 3, 2003 (JP) .............................. 2003-026438

(51) Int. Cl.
*B60Q 1/26* (2006.01)

(52) U.S. Cl. ...................... 362/494; 362/545; 362/516; 362/245; 362/800

(58) Field of Classification Search ................ 362/487, 362/494, 245, 545, 516, 800, 303
See application file for complete search history.

(56) References Cited

U.S. PATENT DOCUMENTS

| | | | |
|---|---|---|---|
| 4,916,430 A | 4/1990 | Vu et al. | |
| 6,139,171 A | 10/2000 | Waldmann | |
| 6,271,750 B1 | 8/2001 | Brautigam et al. | |
| 6,325,517 B1 | 12/2001 | Kuo | |
| 6,637,917 B2 | 10/2003 | Schwanz et al. | |
| 6,749,325 B2 * | 6/2004 | Bukosky et al. | ............ 362/494 |
| 7,008,091 B2 * | 3/2006 | Mathleu et al. | ............. 362/494 |
| 2001/0010633 A1 * | 8/2001 | Apfelbeck | .................. 362/494 |
| 2002/0057575 A1 * | 5/2002 | Schwanz et al. | ............ 362/487 |

FOREIGN PATENT DOCUMENTS

| | | |
|---|---|---|
| DE | 200 17 038 U1 | 2/2001 |
| JP | 10-297362 A | 11/1998 |
| JP | 2002-19519 A | 1/2002 |
| JP | 2002-337606 A | 11/2002 |

* cited by examiner

*Primary Examiner*—Stephen F Husar
(74) *Attorney, Agent, or Firm*—Foley & Lardner LLP

(57) ABSTRACT

An exterior mirror for a vehicle includes a mirror housing that houses a mirror, a chassis that is put on the mirror housing to form a hollow space between the chassis and the mirror housing, the chassis having an opening former at a portion, and a lamp that is arranged in the hollow space. The lamp includes a light source that emits light, and a reflector that reflects the light toward the opening. The light source is arranged in such a manner that the light from the light source does not illuminate the opening directly.

11 Claims, 11 Drawing Sheets

EXTERIOR MIRROR HAVING LAMP AND EXTERIOR REAR-VIEW MIRROR HAVING LAMP

CROSS-REFERENCE TO RELATED APPLICATIONS

The present document incorporates by reference the entire contents of Japanese priority document, 2003-26438 filed in Japan on Feb. 3, 2003.

BACKGROUND OF THE INVENTION

1. Field of the Invention

The present invention relates to an exterior mirror having a lamp and an exterior rear-view mirror having a lamp, and more particularly, to a vehicle exterior mirror having a lamp and a vehicle exterior rear-view mirror having a lamp that have a flexibility of light distribution layout in design by adding a twist to a light source or a reflector provided in a case of the mirror.

2. Description of the Related Art

U.S. Pat. No. 6,139,171, for example, describes a similar type of exterior rear-view mirror. The exterior rear-view mirror is for an automobile, having a mirror head 1 provided on an automobile body by a support section. The mirror head 1 is provided at its back surface (surface in an advancing direction of the vehicle) with a housing 2. The mirror head 1 is provided at its surface with a mirror body mounted to an angle adjusting plate. The housing 2 is provided at its back surface with a light window 3 which is positioned at half the height of the housing 2 and extends from the support section to the vicinity of the end of the housing 2 farthest (outside of the vehicle) from the support section.

The light window 3 is provided therein with at least one light source. More practically, a plurality of light emitting diodes (LEDs) 18 is arranged such that they are directed in the far distance. Light beams from luminous bodies 20 of the LEDs 18 are first condensed by cylindrical openings 19 formed in a cover located inside the light window 3 and then, the light beams penetrate through the light window 3 so that the function of the lamp is made reliable. The light beam from the luminous bodies 20 of the LEDs 18 is narrowed by a lens 29 and emitted from the light window 3 toward far-off direction in some cases. A fluorescent tube 21 connected to a control device 22 can be employed as the light source in the light window 3. The fluorescent tube 21 is provided along the shape of the light window 3. A reflector 33 is provided behind the fluorescent tube 21, and the reflector 33 forwardly reflects light leaked backward from the fluorescent tube 21. An optically active layer 32 which can be realized by a prism or a lens is provided on an outer surface of the light window 3. Light from the fluorescent tube 21 becomes optimal light beam as a lamp through the optically active layer 32.

Various outline shapes may be employed for the light window 3. Two or more light windows 3 may be provided on the back surface of the housing 2.

According to the conventional exterior rear-view mirror having a lamp, however, since light is emitted from the center of LEDs 18 or the fluorescent tube 21 as the light source, even if the lamp illuminates, portions of the lamp where the LEDs 18 are provided are dotted with intensively glowing points or the shape of the fluorescent tube 21 becomes too conspicuous. Thus, uniformity and upscale image as design are deteriorated. In the case of an exterior rear-view mirror in which a large space cannot be secured for a lamp, the layout of the light source and the design of the luminous intensity distribution of the lamp unit are largely limited, and thus the design of the lamp unit is prioritized over the design of the entire exterior rear-view mirror. Under such circumstances, auto-parts cannot be designed or manufactured while satisfying recent car manufacturing and sales circumstances in which design is a key element of car sales strategy.

SUMMARY OF THE INVENTION

It is an object of the present invention to solve at least the problems in the conventional technology.

The exterior mirror for a vehicle, according to one aspect of the present invention includes a lamp that has a window that is formed at a portion of a chassis, a reflector that reflects light toward the window, provided inside the chassis, and a light source that emits the light toward the reflector, provided inside the chassis at other portion of the chassis.

The exterior rear-view mirror for a vehicle, according to another aspect of the present invention includes a lamp that has a window that is formed in a space between a chassis and an outside edge of the mirror at a portion of the chassis, a reflector that reflects light toward the window, provided inside the chassis, and a light source that emits the light toward the reflector, provided inside the chassis at other portion of the chassis.

The exterior mirror for a vehicle, according to still another aspect of the present invention includes a mirror housing that houses a mirror, a chassis that is put on the mirror housing to form a hollow space between the chassis and the mirror housing, the chassis having an opening former at a portion, and a lamp that is arranged in the hollow space. The lamp includes a light source that emits light, and a reflector that reflects the light toward the opening. The light source is arranged in such a manner that the light from the light source does not illuminate the opening directly.

The other objects, features, and advantages of the present invention are specifically set forth in or will become apparent from the following detailed descriptions of the invention when read in conjunction with the accompanying drawings.

DETAILED DESCRIPTION

Exemplary embodiments of an exterior mirror having a lamp and an exterior rear-view mirror having a lamp for a vehicle, according to the present invention are explained in detail with reference to the accompanying drawings. However, the invention is not limited to the embodiment. Constituent elements of the embodiments include elements that can easily be replaced by persons skilled in the art and elements that are substantially the same. The exterior mirror for a vehicle can be applied to a mirror provided on an outside of the vehicle for indirectly seeing a position that cannot be easily directly seen from a driver. A lamp includes one which lights up to serve a given function such as turn indicators, width indicators, and hazard lights.

Figure 1:
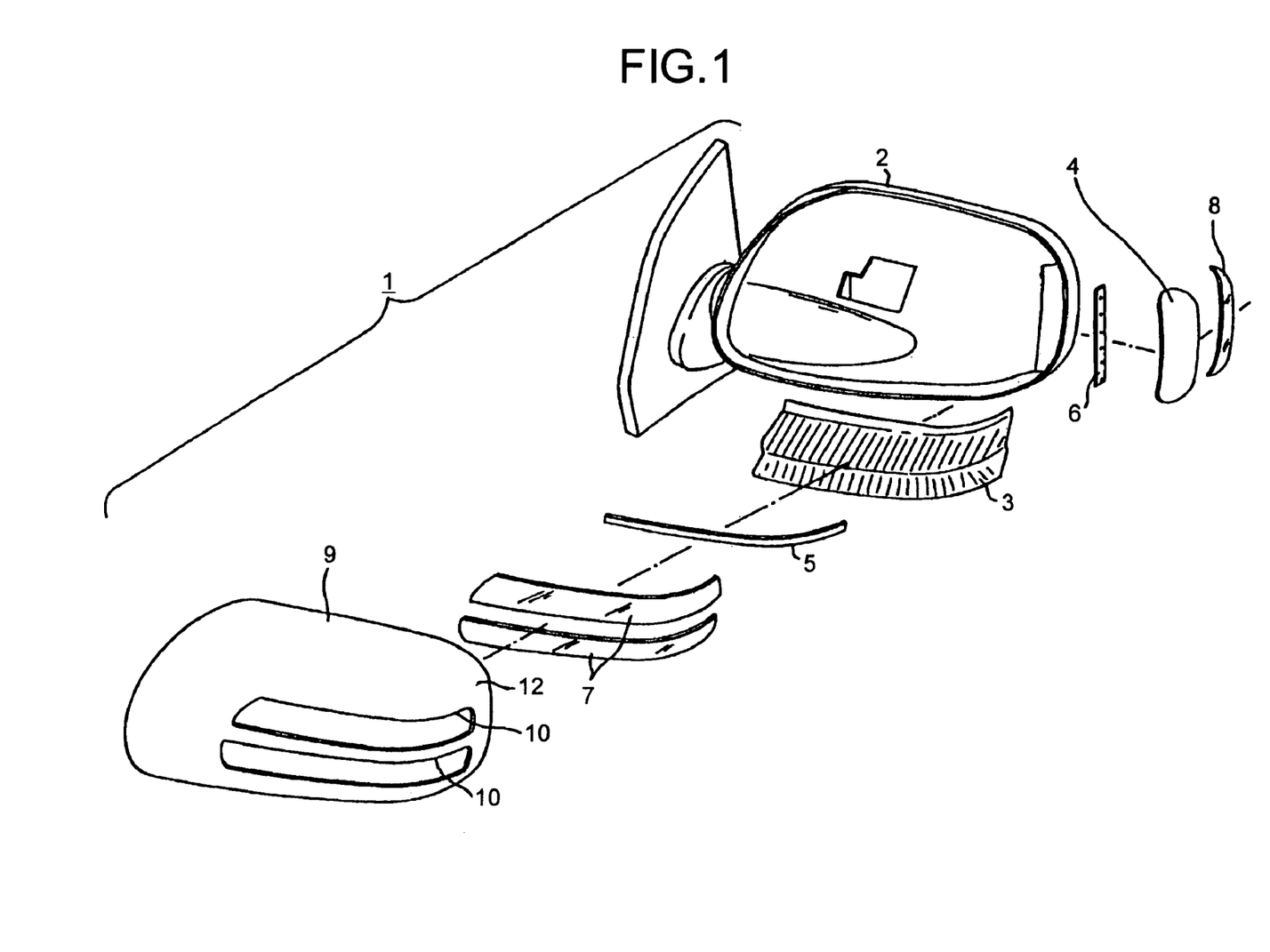
FIG. 1 is a schematic assembly diagram for illustrating a first example of an exterior mirror having a lamp for a vehicle.

FIG. 1 is a schematic assembly diagram for illustrating a first example of an exterior mirror having a lamp for a vehicle. The exterior mirror is an example of an exterior rear-view mirror 1 provided on a left side of a vehicle. The exterior rear-view mirror 1 includes a housing 2, reflectors 3 and 4, light sources 5 and 6, lenses 7 and 8, and a garnish 9. To secure a function as the exterior rear-view mirror 1, the housing 2 is provided therein with a mirror member, a motor that can adjust an angle of the mirror member, a gear, and the like.

In the case of the exterior rear-view mirror 1, the garnish 9 which is the outermost plate serves as a chassis. In the case of an exterior rear-view mirror 1 having no garnish 9, the housing 2 itself serves as the chassis. Windows 10 are provided in a portion of a back surface (front surface of the vehicle) of the garnish 9. The garnish 9 largely bulges in the lateral direction of the vehicle from the housing 2. A window for irradiating rearward of the vehicle may be formed between the housing 2 and an outside portion of the exterior rear-view mirror 1 furthest from the vehicle.

After the garnish 9 is assembled, the housing 2 is positioned inside the windows 10. The reflector 3 which reflects light from the light source 5 is provided between the housing 2 and the garnish 9, more preferably on the housing 2 itself. To provide the reflector 3 on the housing 2 itself, deposition, plating or high reflection coating can be utilized. If the reflector 3 is provided on the housing 2 itself, it is advantageous that the number of parts is reduced. The light source 5 is provided on a back side of the garnish 9 such as to be opposed to the reflector 3 such that a back surface of the light source 5 is directed forward of the vehicle which is the final irradiation direction. More specifically, as illustrated in FIG. 1, the light source 5 is provided on a back side of the garnish 9 between the two windows 10 formed in the garnish 9, so as to be opposed to the reflector 3. Thus, the light from the light source 5 is reflected by the reflector 3, the light is completely indirectly distributed, and emitted from the windows 10 opened in the final irradiation direction of the lamp.

When a lamp which irradiates not only forward of the vehicle but also rearward of the vehicle with light is provided on the exterior rear-view mirror 1, the light source 6 is provided on a side of the housing such that a main optical axis is directed laterally. The light from the light source 6 is reflected by the reflector 4 and emitted from a window formed between the garnish 9 and the housing 2. If the exterior rear-view mirror 1 does not have the garnish 9, the window may be formed between the housing 2 and the mirror so that the light from the light source 6 is emitted from the window. In such a case, a new light source 6 may be provided as described above. Light from the light source 5 may be introduced both forward and rearward of the vehicle by combining the reflectors 3 and 4. Although the light source 6 is provided on the side of the housing 2 in FIG. 1, the light source 6 may be provided on the side of the garnish 9.

In typical light sources 5 and 6, LEDs having leads are mounted on boards by dip soldering. When a height (thickness) of the light source is largely limited and the layout on the exterior rear-view mirror is limited, a light source in which LEDs are mounted on a surface of a flexible board made of glass epoxy and the like is used. If the LEDs are mounted on the surface, its height (thickness) is reduced as thin as 2 millimeters for example. With this thickness, together with flexibility of the flexible board, it is possible to design the light sources 5 and 6 so as not to deteriorate the design of the exterior rear-view mirror.

Conventionally, when high-intensity LEDs are used, impression on a point-source cannot be adjusted unless the point-source is corrected by the lens. The exterior mirror having a lamp of the present invention is such that the light from the light source is completely indirectly distributed by the reflectors 3 and 4. Thus, even if the lenses 7 and 8 are clear, positions of the light sources 5 and 6 are inconspicuous. According to the exterior mirror having a lamp, the entire windows 10 can light up brightly and excellent design can be made. The lens may be provided with a prism as required.

The configuration of the mirror having a lamp in which the light is distributed completely indirectly can be applied not only to the exterior rear-view mirror but also to an exterior mirror such as a mirror for seeing a rear and low position of the vehicle having a high mount stop lamp.

Figure 2:
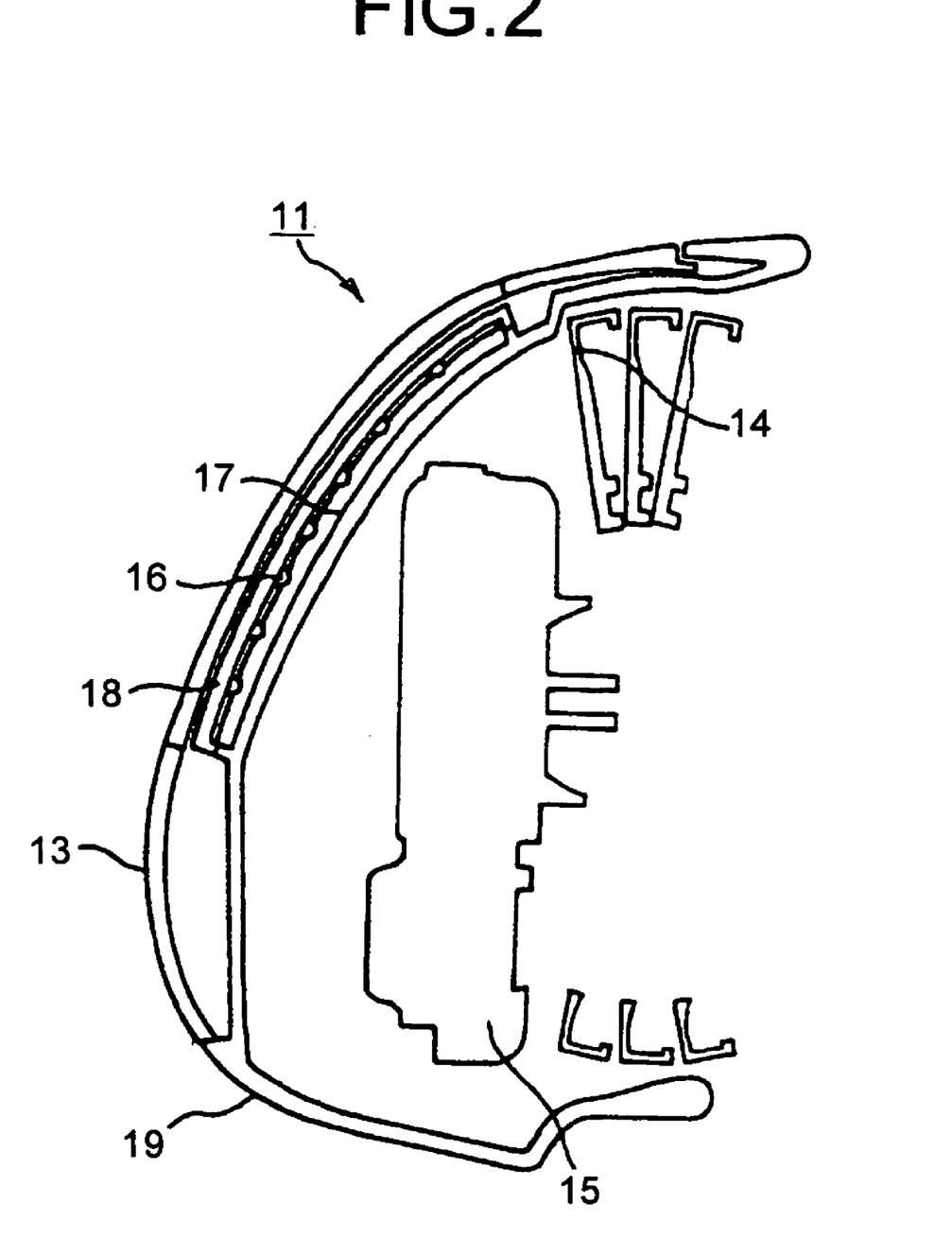
FIG. 2 is a cross section of an exterior rear-view mirror having a lamp for a vehicle.

FIG. 2 is a cross section of an exterior rear-view mirror having a lamp for a vehicle. A portion of a housing 19 of the exterior rear-view mirror 11 is covered with a garnish 13. A mirror operating unit 15 which adjusts an angle of a support member 14 for fixing a mirror member is accommodated inside the housing 19. As the light source, LEDs 16 mounted on a surface of a flexible board are used. A reflector 17 is provided on a back surface of the housing 19, and light from the light source is distributed completely indirectly. If the final irradiation direction of the light is covered with a clear or translucent lens 18 or a clear cover, a lamp can be formed in a narrow space formed between the housing 12 and the garnish 13. Thus, a layout of the light source can comply with the design curved surface of the exterior mirror, and the flexibility of the luminous intensity distribution design is enhanced.

Figure 3:
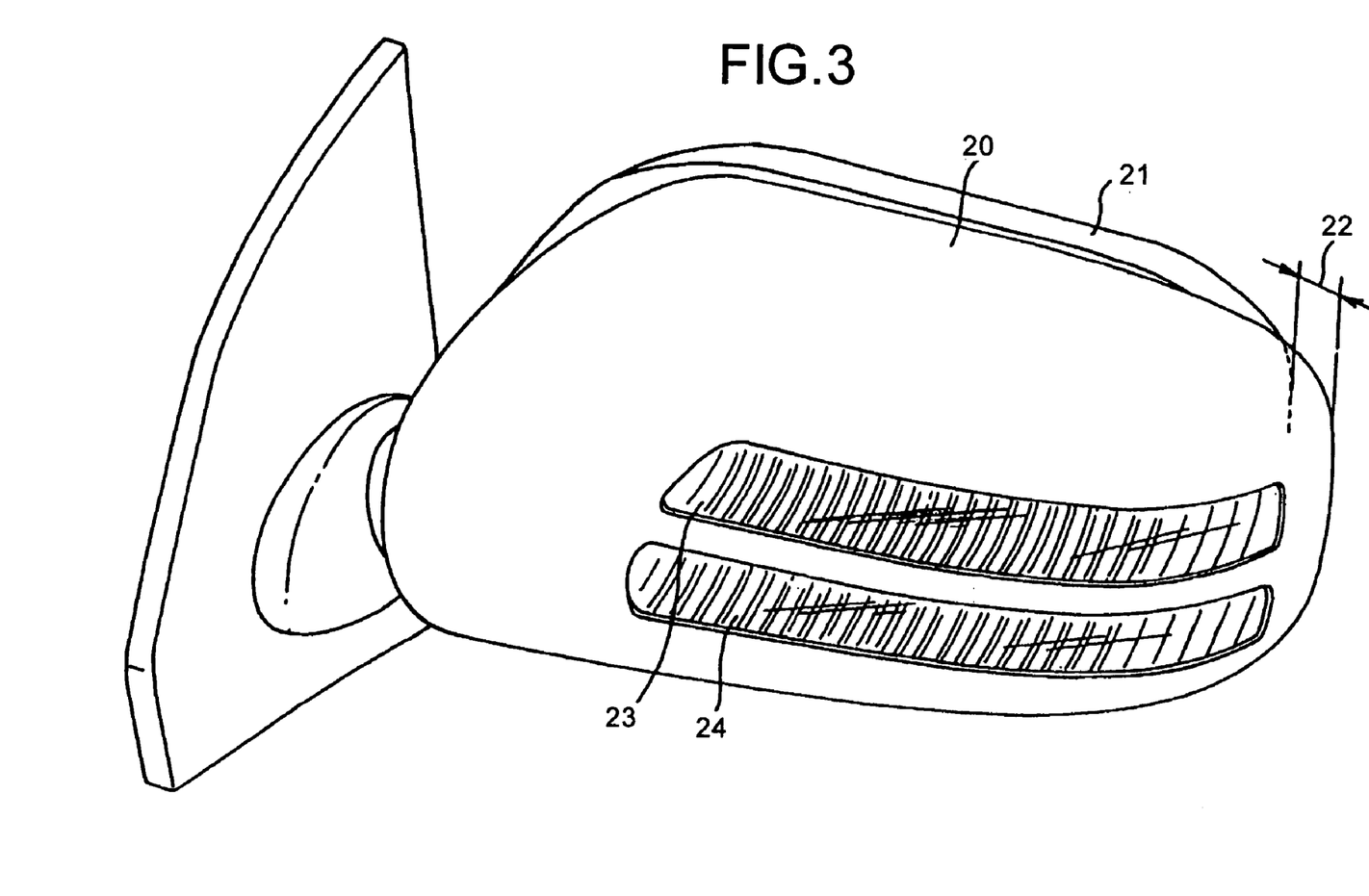
FIG. 3 is an external view of the exterior mirror shown in FIG. 1.

FIG. 3 is an external view of the exterior mirror shown in FIG. 1. In this exterior mirror, the light source is provided on the back side thereof between windows 23 and 24. Thus, the light source cannot be seen from outside. The light from the light source is reflected by a reflector and the light is emitted from the entire windows 23 and 24. A garnish 20 bulges outward from an outer side of an outer end of a mirror of the housing 21 by a predetermined distance 22. As a result, a substantially crescent or square window is formed in the gap. The light is emitted from the window rearward of the vehicle, and the window can also serve as a turn indicator.

Figure 4:
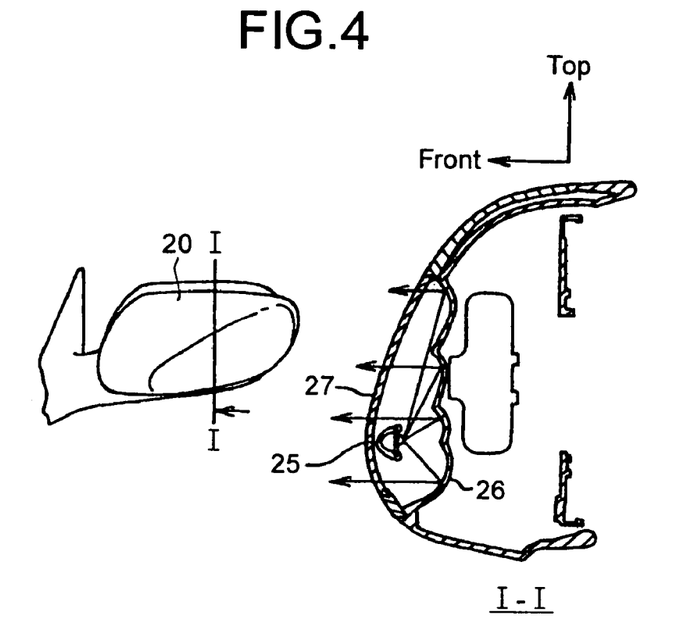
FIG. 4 is a schematic diagram for illustrating a state of a forward light distribution of the exterior mirror.

FIG. 4 is a schematic diagram for illustrating a state of a forward light distribution of the exterior mirror. In the case of the forward luminous intensity distribution, light from a light source 25 is reflected by a reflector 26 provided on a back surface of the housing, and the light is emitted forward of the vehicle through a clear or translucent lens 27, having a prism in some cases, as shown with arrows.

Figure 5:
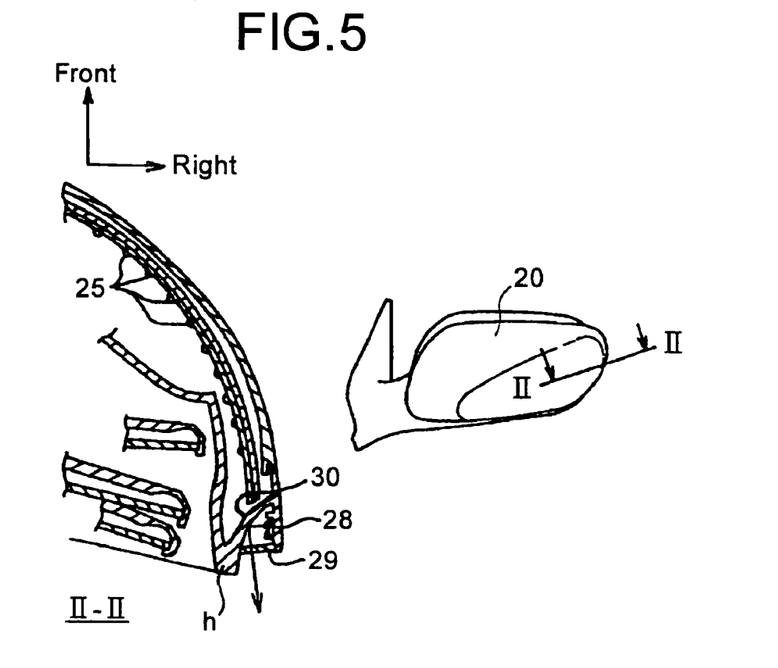
FIG. 5 is a schematic diagram for illustrating a state of a backward light distribution of the exterior mirror.

FIG. 5 is a schematic diagram for illustrating a state of a backward light distribution of the exterior mirror. In the case of the rearward luminous intensity distribution, a window 29 which is opened in the final irradiation direction of light is provided between a housing and a garnish located outside of an outer end of a mirror. Light from a light source 28 is reflected by a reflector 30 which is integrally formed on the housing, and the light is distributed indirectly and emitted rearward of the vehicle. The window 29 is displaced forward from a mirror surface in an advancing direction of the vehicle. With this configuration, light emitted through the window is shielded by the housing h located on the outer end of the mirror, and the light is prevented from directly entering the eyes of a driver. Thus, the viewability of the exterior rear-view mirror by the driver is not, deteriorated, and a turn indicator which can easily be seen from a following car can be formed.

The exterior rear-view mirror of this invention is such that the lamp of the mirror completely indirectly distributes light from the light source by the reflector. Thus, it is advantageous that light can be distributed in any irradiation direction depending upon design of the reflector without paying attention to a position or an orientation of the light source. When a light source in which the LEDs are mounted on the surface of the flexible board is used, due to the flexibility and size of the board, it is advantageous that the flexibility in layout of the light source is remarkably enhanced even if the space in the mirror housing or in the garnish is small.

Figure 6:
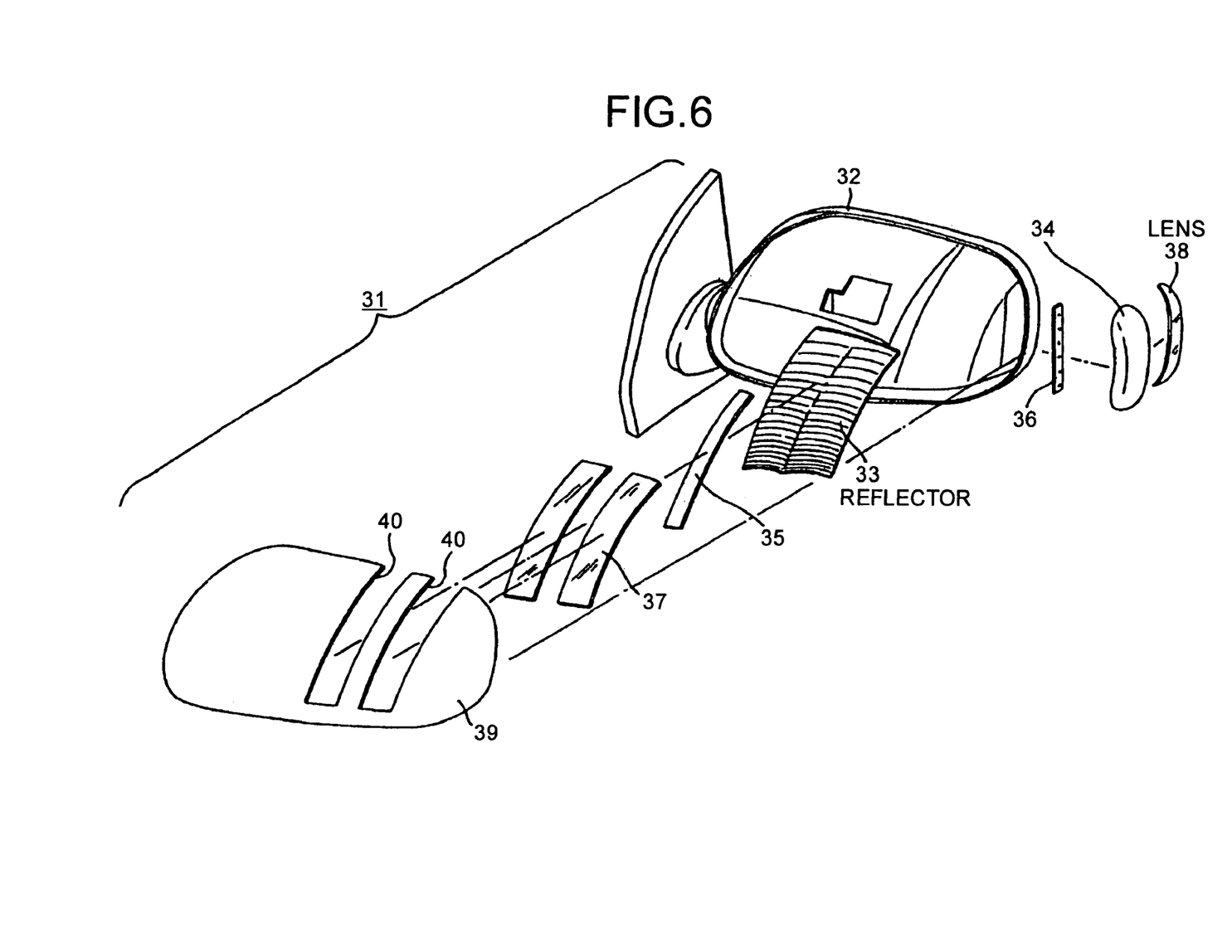
FIG. 6 is a schematic assembly diagram for illustrating a second example of the exterior mirror.

FIG. 6 is a schematic assembly diagram for illustrating a second example of the exterior mirror. This exterior mirror is an example of the exterior rear-view mirror provided on the left side of the vehicle. The exterior rear-view mirror 31 includes a housing 32, reflectors 33 and 34, light sources 35 and 36, lenses 37 and 38, and a garnish 39.

Vertically long two windows 40 are formed in a portion of a back surface of the garnish 39. As described above, the garnish 39 largely bulges outward from the housing 2, and the windows may be formed between the outermost side of the exterior rear-view mirror 1 and the housing 2.

The light source 35 is provided on the back side of the garnish 39 and between the two windows 40, and the housing 32 itself is provided with the reflector 33 which reflects light from the light source 5 as described above. The light from the light source 35 is reflected by the reflector 33 and is distributed completely indirectly, and emitted from the windows 40 which are opened in the final irradiation direction of the lamp as described above.

When a lamp which emits light not only forward but also rearward of the vehicle is provided on the exterior rear-view mirror 1, the light source 36 may be provided on a side of an outside of the housing, light from the lamp may be reflected by the reflector 34, and the light may be emitted from the windows formed between the garnish 39 and the housing 32 as described above. The exterior mirror having a lamp of this invention is such that the mirror can satisfy various designs.

Figure 7:
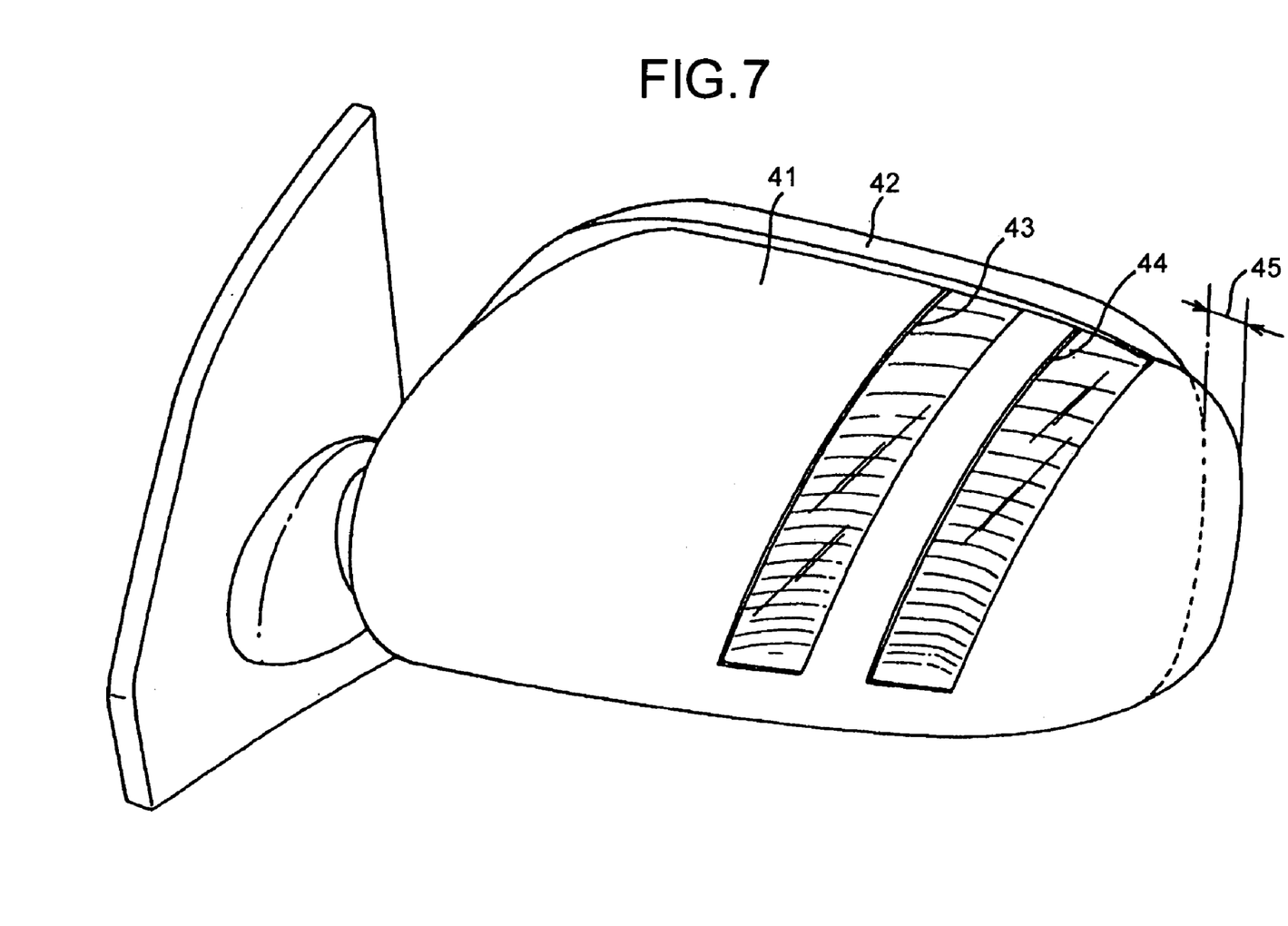
FIG. 7 is an external view of the exterior mirror shown in FIG. 6.

FIG. 7 is an external view of the exterior mirror shown in FIG. 6. In this exterior mirror, since the light source is provided on the back side between the windows 43 and 44, the exterior mirror has a feature that the light source cannot be seen from outside. The light from the light source is reflected by the reflectors and emitted from the entire two windows 43 and 44. The garnish 41 may bulge outward from the outside of the outer end of the mirror of the housing 42 by a predetermined distance 45, and the substantially crescent or square windows may be formed therebetween. In this case, the light is emitted from the windows rearward of the vehicle, and the windows have functions as turn indicating device.

Figure 8:
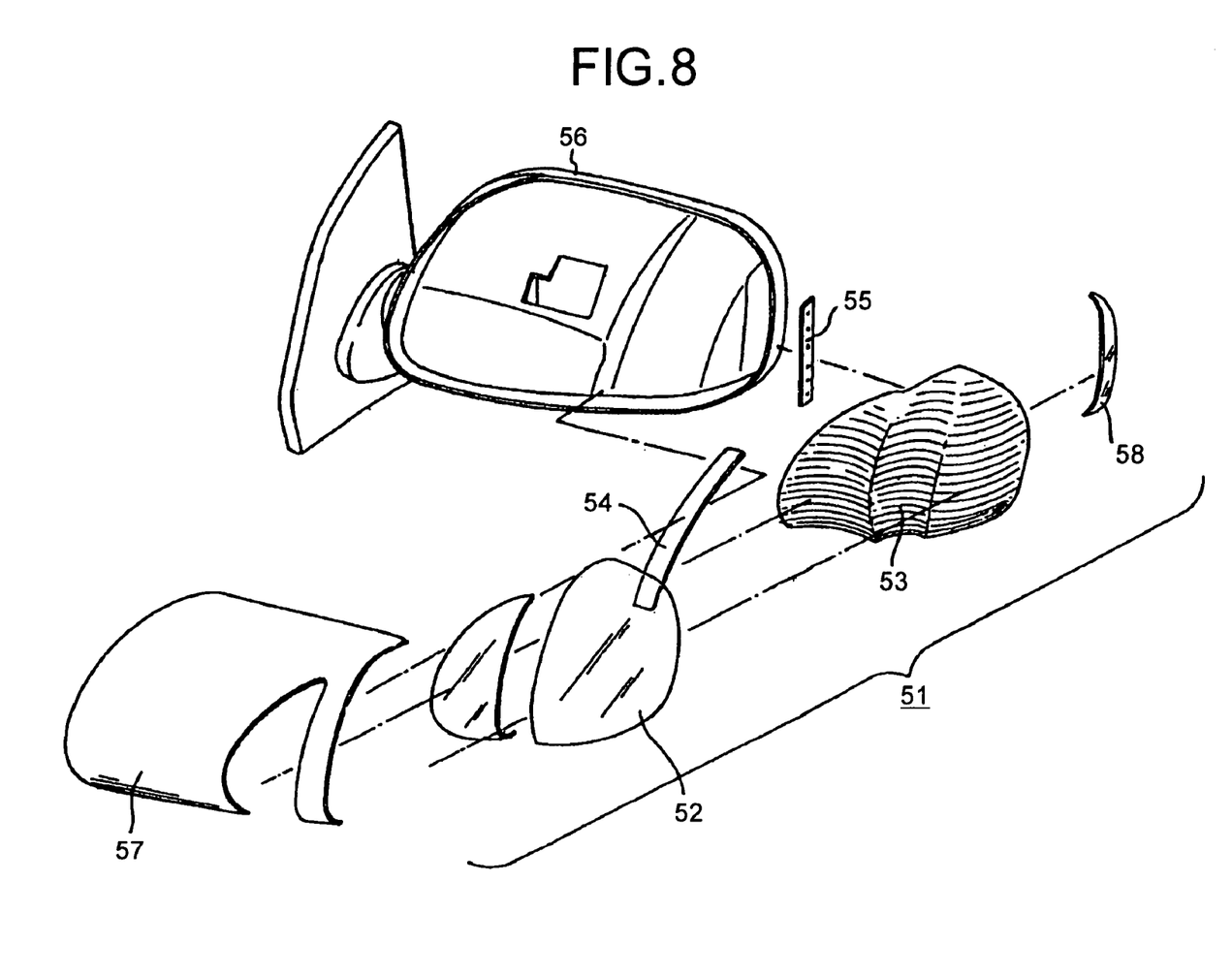
FIG. 8 is a schematic assembly diagram for illustrating a third example of the exterior mirror.

FIG. 8 is a schematic assembly diagram for illustrating a third example of the exterior mirror. This exterior mirror is also an example of the exterior rear-view mirror provided on the left side of the vehicle. This exterior mirror is different from the above exterior mirror mainly in that a reflector 53 has a different shape. The single reflector 53 can distribute light forward and rearward of the vehicle. That is, a left half of the reflector 53 illustrated in FIG. 8 is designed to reflect light from a light source 54 forward of the vehicle, and a back surface of a right half is designed to reflect light from a light source 55 rearward of the vehicle.

Figure 9:
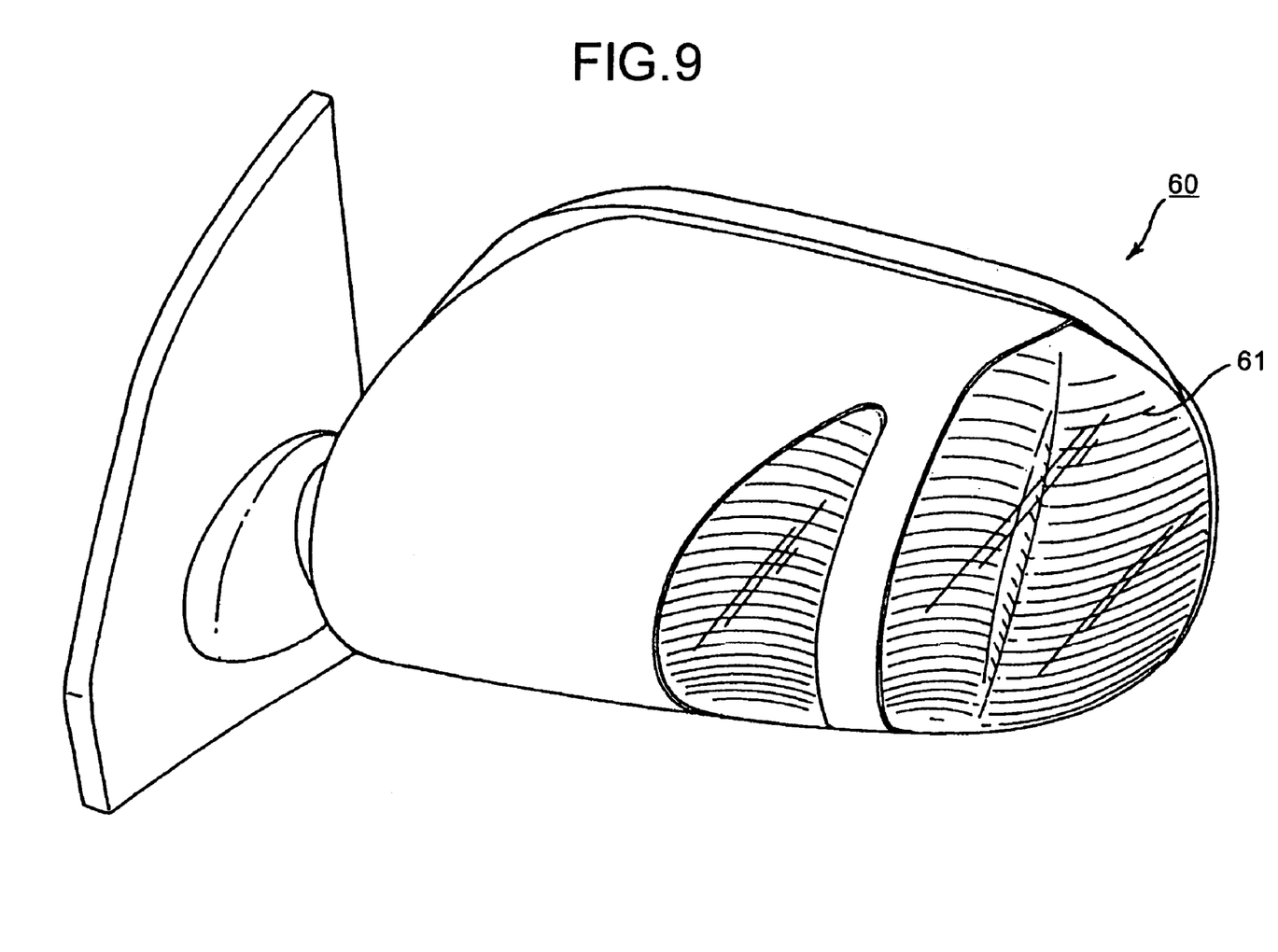
FIG. 9 is an external view of the exterior mirror shown in FIG. 8.

FIG. 9 is an external view of the exterior mirror shown in FIG. 8. In this exterior mirror 60, a lens cover 61 fitted to a window is formed such as to cover an end of the exterior mirror 60. The light is emitted forward and rearward of the vehicle by the reflector disposed in the deep side of the cover. According to the exterior mirror having a lamp of this invention, the mirror can satisfy such a design.

Figure 10:
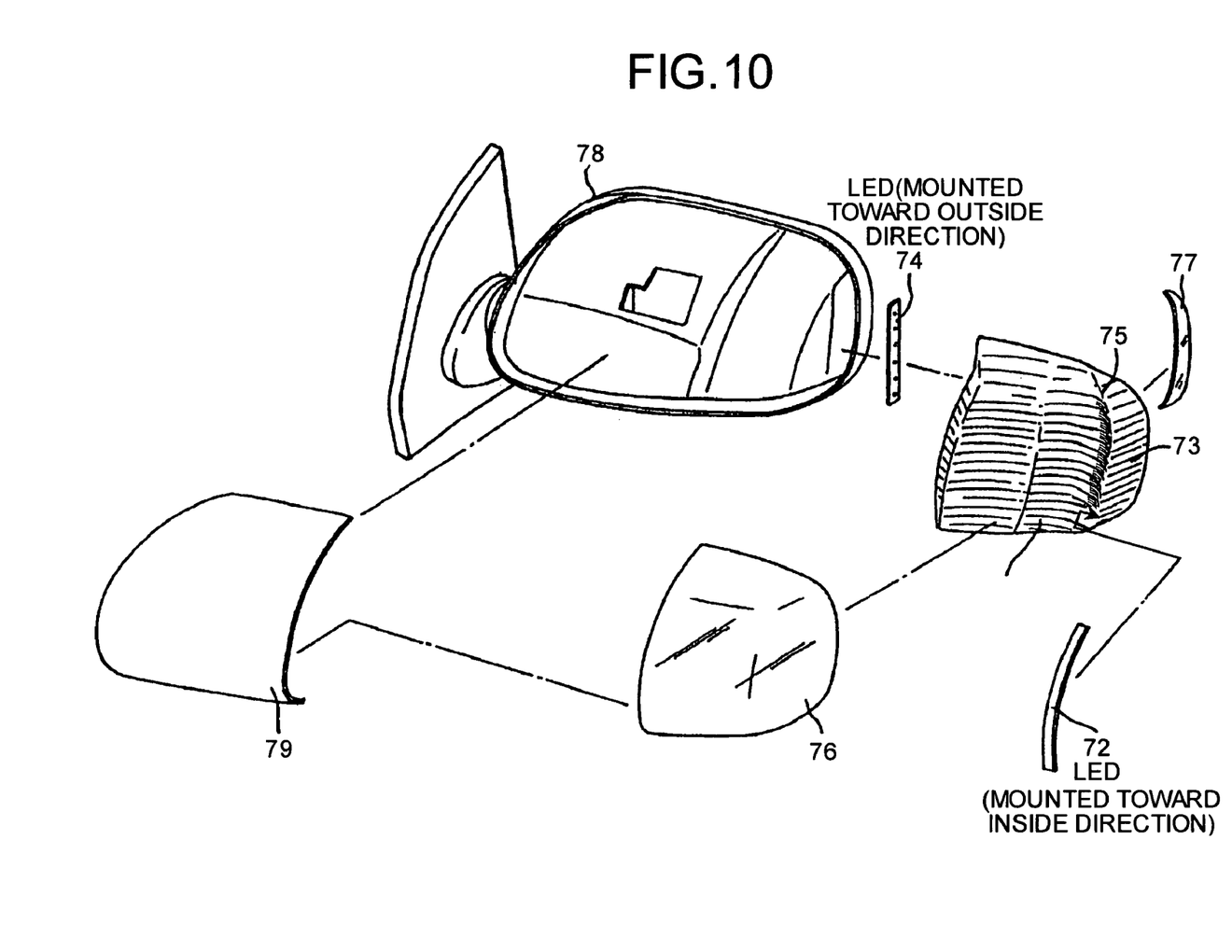
FIG. 10 is a schematic assembly diagram for illustrating a fourth example of the exterior mirror.

FIG. 10 is a schematic assembly diagram for illustrating a fourth example of the exterior mirror. This exterior mirror is also an example of an exterior rear mirror provided on the left side of the vehicle. This exterior mirror is different from the above exterior mirror in that the mounting position of a light source 72 is different. In a reflector 73 of this exterior mirror 71, like the reflector illustrated in FIG. 8, a left half of the reflector 73 is designed to reflect light forward of the vehicle, and a back surface of a right half is designed to reflect light from a light source 74 rearward of the vehicle. A thin light source 72 in which LEDs are mounted on a surface of a flexible board is inwardly provided on a running-up portion 75 on the outside of the reflector 73. A left half of the reflector 73 is formed into a largely recessed surface, and is curved into such a shape that the reflector 73 is directed laterally with respect to the vehicle in the vicinity of the outer side thereof. The reflector 73 is bent at an acute angle at immediately outside. The running-up portion 75 is a portion of a surface of the reflector 73 which is directed to the vehicle. The light from the light source 72 is reflected by the left half of the reflector 73, and is introduced into the final irradiation direction. With this configuration, the position of the light source can be inconspicuous when seen from the final irradiation direction of light. The function as a lamp which emits light forward is obviously secured. With this configuration, it is advantageous that the number of parts and the number of assembling procedures are reduced.

Figure 11:
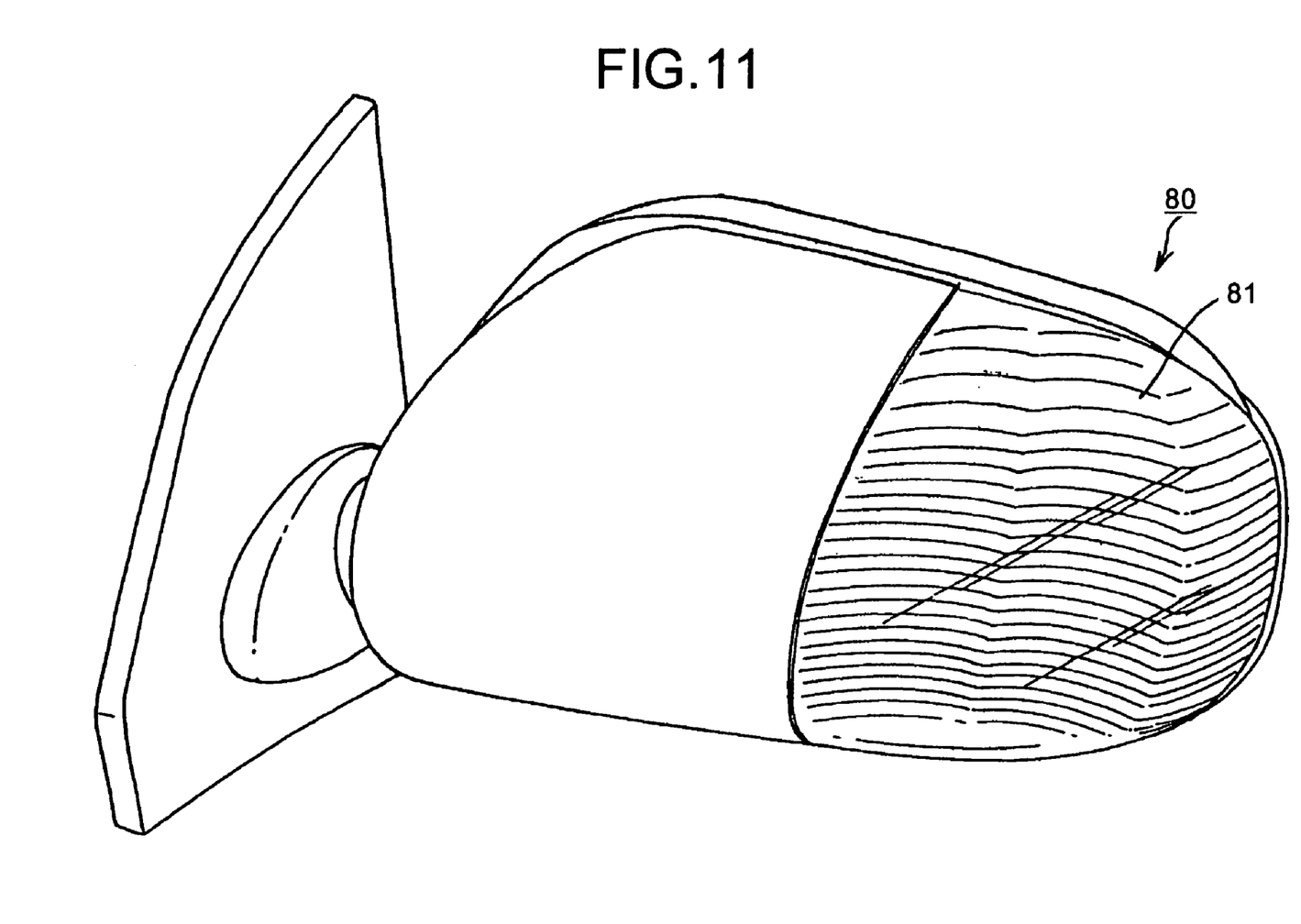
FIG. 11 is an external view of the exterior mirror shown in FIG. 10.

FIG. 11 is an external view of the exterior mirror shown in FIG. 10. In an exterior mirror 80, a large single lens cover 81 covers an end of the exterior mirror 80. Light is emitted forward of the vehicle by a light source provided on a running-up portion on a surface of a reflector located in the deep portion of the cover. Light from the light source provided in the housing is reflected to a back surface of the reflector and is emitted also rearward of the vehicle. Since the light source in which LEDs are mounted on a surface of a flexible board is thin, the light source can be used in a special manner such that the light source can be provided on the reflector itself. The light can be emitted to any direction if the reflector is designed appropriately. The exterior mirror having a lamp of this invention can satisfy such a design.

Figure 12:
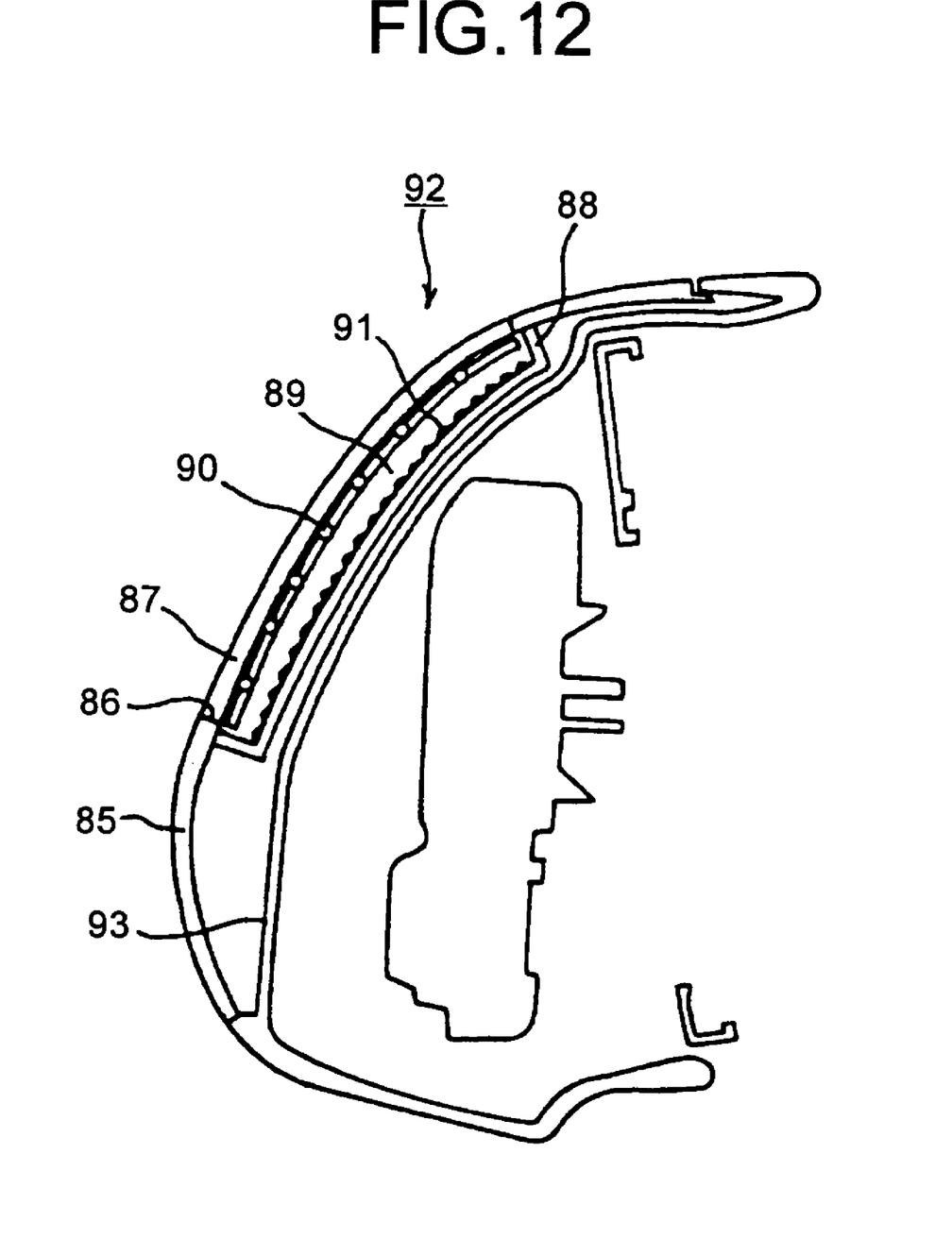
FIG. 12 is a cross section of the exterior mirror.

FIG. 12 is a cross section of the exterior mirror. A configuration of a basic portion of this exterior mirror is the same as that of the above-described exterior mirror. This example has a feature that the lamp includes a chassis, that is, the lamp is sub-assembled with a garnish 85 in this case as one unit. The garnish 85 is provided with a window 86 in the final irradiation direction of light. The window 86 is provided with a clear or translucent lens 87 or a lens having a prism. The lens 87 may be integrally formed on the garnish 85 or a separate member may be fitted to the lens 87.

A cover 88 is provided around a back side of the window 87 such as to cover the window from its back side. With this cover, a space 89 having a given capacity is formed on the back side of the garnish 85. A reflector 91 and a light source 90 in which LEDs are mounted on a surface of the flexible board and which is opposed to the reflector 91, are provided in the cover 88. The light source 90 comprises a flexible board and. When two or more windows 86 are to be formed, each window 86 may be provided with the cover 88 such as to cover the window from its back side, or one cover 88 may cover all of the windows 86 from the back side.

If the reflector is formed on the inner surface of the cover 88, the operability is further enhanced and the number of parts can be reduced. If a gap between the lens 87 and the garnish 85 and a gap between the garnish 85 and the cover 88 are sealed, the lamp assembly is hermetically closed in a water-proof manner. With this configuration, the lamp 92 and the garnish 85 can be integrally formed together as one unit, and they can be handled easily. If the garnish 85 is put on the housing 93 so as to cover the housing, the exterior mirror having a lamp can easily be formed. When the exterior mirror is provided with the water-proof function, the wiring of the light source 90 is preferably sealed so that water-proof function of the space is not deteriorated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An exterior mirror for a vehicle, comprising:
    a lamp that includes
        a window that is formed at a portion of a chassis;
        a reflector that reflects light toward the window, provided inside the chassis; and
        a light source that emits the light toward the reflector, provided inside the chassis, the light source arranged in such a manner that the light from the light source does not illuminate the window directly, wherein the lamp includes multiple light sources and each light source of the lamp which is provided inside the chassis emits light toward the reflector, and each light source of the lamp is arranged in such a manner that the light from the light source does not illuminate the window directly.

2. The exterior mirror according to claim 1, wherein the chassis is a garnish.

3. The exterior mirror according to claim 1, wherein the multiple light sources include light emitting diodes that are surface-mounted on a flexible board.

4. The exterior mirror according to claim 3, wherein the multiple light sources including the light emitting diodes that are surface-mounted on the flexible board are arranged at an outer convex.

5. The exterior mirror according to claim 3, wherein the window includes
    a lens that transmits the light reflected from the reflector; and
    a cover that covers a backside surrounding-area, the cover forms a space of a predetermined capacity, and the reflector and the multiple light sources including the light emitting diodes that are surface-mounted on the flexible board are disposed in the space.

6. An exterior mirror for a vehicle, comprising:
    a lamp that includes
        a window that is formed at a portion of a chassis;
        a reflector that reflects light toward the window, provided inside the chassis; and
        a light source that emits the light toward the reflector, provided inside the chassis, the light source arranged in such a manner that the light from the light source does not illuminate the window directly; and
    a mirror housing that houses a mirror, wherein
    the reflector is provided on a back side of the mirror housing.

7. The exterior mirror according to claim 6, wherein
    the chassis is a garnish having a cover, and
    the exterior mirror is formed by putting the garnish on the minor housing.

8. An exterior rear-view mirror for a vehicle, comprising:
    a lamp that includes
        a window that is formed in a space between a chassis and an outside edge of the mirror at a portion of the chassis;
        a reflector that reflects light toward the window, provided inside the chassis; and
        a light source that emits the light toward the reflector, provided inside the chassis, the light source arranged in such a manner that the light from the light source does not illuminate the window directly, wherein the lamp includes multiple light sources and each light source of the lamp which is provided inside the chassis emits light toward the reflector, and each light source of the lamp is arranged in such a manner that the light from the light source does not illuminate the window directly.

9. The exterior rear-view mirror according to claim 8, wherein the multiple light sources include light emitting diodes that are surface-mounted on a flexible board.

10. The exterior rear-view mirror according to claim 8, wherein the window is displaced from surface of the mirror in a direction of movement of the vehicle.

11. An exterior mirror for a vehicle, comprising:
    a mirror housing that houses a mirror;
    a chassis that is disposed on the mirror housing to form a hollow space between the chassis and the mirror housing, the chassis having an opening formed at a portion; and
    a lamp that is arranged in the hollow space, the lamp including
        a light source that emits light; and
        a reflector that reflects the light toward the opening, wherein
    the light source is arranged in such a manner that the light from the light source does not illuminate the opening directly,
    wherein the lamp includes multiple light sources and each light source of the lamp which is provided inside the chassis emits light toward the reflector, and each light source of the lamp is arranged in such a manner that the light from the light source does not illuminate the opening directly.

* * * * *